(12) United States Patent
Gleckman et al.

(10) Patent No.: US 6,563,648 B2
(45) Date of Patent: May 13, 2003

(54) COMPACT WIDE FIELD OF VIEW IMAGING SYSTEM

(75) Inventors: Philip Landon Gleckman, Boulder, CO (US); Jacob Moskovich, Cincinnati, OH (US)

(73) Assignee: Three-Five Systems, Inc., Tempe, AZ (US)

( * ) Notice: Subject to any disclaimer, the term of this patent is extended or adjusted under 35 U.S.C. 154(b) by 4 days.

(21) Appl. No.: 09/872,111

(22) Filed: Jun. 1, 2001

(65) Prior Publication Data

US 2003/0030912 A1 Feb. 13, 2003

Related U.S. Application Data (60) Provisional application No. 60/242,189, filed on Oct. 20, 2000.

(51) Int. Cl.$^7$ .............................. G02B 27/14; G02B 5/04
(52) U.S. Cl. ...................................... 359/630; 359/831
(58) Field of Search ...................... 385/31, 36; 362/385; 359/831, 832, 833, 834, 630, 631, 633, 637, 638, 639, 640

(56) References Cited

U.S. PATENT DOCUMENTS

| | | | |
|---|---|---|---|
| 3,559,090 A | 1/1971 | Refermat et al. ............ 359/582 |
| 3,748,015 A | 7/1973 | Offner ......................... 359/631 |
| 3,787,109 A | 1/1974 | Vizenor ....................... 359/366 |
| 4,049,944 A | 9/1977 | Garvin et al. ............... 219/121 |
| 4,415,233 A | 11/1983 | Itoh et al. .................... 359/583 |
| 4,514,479 A | 4/1985 | Ferrante ......................... 430/2 |
| 4,854,688 A | 8/1989 | Hayford et al. ............. 359/433 |
| 5,151,722 A | 9/1992 | Massof et al. .............. 351/158 |
| 5,212,375 A | 5/1993 | Goto et al. ............... 250/201.7 |
| 5,285,318 A | 2/1994 | Gleckman ................... 359/709 |
| 5,440,197 A | 8/1995 | Gleckman ................... 313/110 |
| 5,446,710 A | 8/1995 | Gardner et al. ......... 369/44.14 |
| 5,450,237 A | 9/1995 | Yoshida et al. ............. 359/562 |
| 5,663,833 A | 9/1997 | Nanba et al. ................ 359/631 |
| 5,684,354 A | 11/1997 | Gleckman ................... 313/110 |
| 5,696,521 A | 12/1997 | Robinson et al. .............. 345/8 |
| 5,748,368 A | 5/1998 | Tamada et al. ............. 359/486 |
| 5,768,025 A | 6/1998 | Togino et al. .............. 359/633 |
| 5,771,124 A | 6/1998 | Kintz et al. ................. 359/633 |
| 5,790,312 A | 8/1998 | Togino ........................ 359/631 |
| 5,795,049 A | 8/1998 | Gleckman ................... 353/122 |
| 5,886,822 A | 3/1999 | Spitzer ........................ 359/630 |
| 5,892,325 A | 4/1999 | Gleckman ................... 313/578 |
| 5,892,624 A | 4/1999 | Kintz et al. ................. 359/637 |
| 5,995,291 A | 11/1999 | Togino ........................ 359/631 |
| 6,005,720 A | 12/1999 | Watters et al. .............. 359/633 |
| 6,023,373 A | 2/2000 | Inoguchi et al. ............ 359/633 |
| 6,038,005 A | 3/2000 | Handschy et al. ............ 349/61 |
| 6,046,867 A | * 4/2000 | Rana ........................... 359/831 |
| 6,122,103 A | 9/2000 | Perkins et al. .............. 359/486 |
| 6,181,475 B1 | 1/2001 | Togino et al. ............... 359/630 |
| 6,204,975 B1 | 3/2001 | Watters et al. .............. 359/633 |

FOREIGN PATENT DOCUMENTS

| | | | |
|---|---|---|---|
| EP | 0945748 A2 | 9/1999 | ........... G02B/27/01 |
| EP | 1 176 449 A2 | 1/2002 | |
| JP | 2291516 A2 | 12/1990 | ........... G02B/23/24 |
| JP | 09166760 | 6/1997 | |

* cited by examiner

Primary Examiner—Georgia Epps
Assistant Examiner—Mohammad Abutayeh
(74) Attorney, Agent, or Firm—Ingrassia Fisher & Lorenz, P.C.

(57) ABSTRACT

The present invention provides an enhanced viewing eyepiece for a micro-display. In one embodiment, the invention is an optical imaging system that includes a prism having a first face directed toward a display to receive light from the display and direct it through a second face, a converging optical element between the second face of the prism and the display, and a reflective converging optical element adjacent the second face of the prism to receive the display light through the second face of the prism and reflect it back into the second face of the prism, the invention further includes a diverging optical element aligned with the reflective converging optical element to receive the display light reflected back into the first prism and direct it to an exit pupil.

27 Claims, 4 Drawing Sheets

COMPACT WIDE FIELD OF VIEW IMAGING SYSTEM

CROSS-REFERENCE TO RELATED APPLICATIONS

This application claims the priority of Provisional Application Serial No. 60/242,189, filed on Oct. 20, 2000.

BACKGROUND OF THE INVENTION

1. Field of the Invention

The invention relates generally to the field of eyepieces for small displays. More particularly, the invention relates to compact imaging systems using folded optical paths to produce a wide field of view of a small display.

2. Description of the Related Art

Liquid Crystal on Silicon (LCoS) micro-displays such as the CMD8X6D and CMD8X6P available from Zight Corporation of Boulder Colo. provide great advantages for compact near-eye applications. LCoS micro-displays produce a high resolution image by changing the polarization state of incident light. In the dark state, a pixel reflects light with substantially no change in polarization. In the bright state, the pixel rotates the polarization state of reflected incident light to the corresponding orthogonal state. By illuminating the display with polarized light and then filtering out nearly all reflected light of that polarization, the display image can be viewed by the human eye. Other miniature displays use either polarization effects or reflectivity changes to produce an image.

Typically, the display is illuminated with pulsed red, green, and blue light while the display is synchronized to the pulsed light source to reflect the appropriate color component of the image. The rapidly alternating red, green, and blue images are blended in human perception to form the full-color image of the display. However, the display can also be illuminated with monochromatic light for data or targeting displays. Such displays are used, for example in helmet, windshield, and visor projection systems as well as in small portable headsets and handsets for private display viewing and for virtual reality systems.

A typical illumination and eyepiece system using pulsed LEDs to illuminate the display and a polarizing beam splitter to conduct the reflected bright light to a viewer is shown, for example, in U.S. Pat. No. 6,038,005 to Handschy et al, FIG. 18A. In that patent, the light from the pulsed LEDs is diffused, then collimated by a Fresnel lens and directed to a polarizing beam splitter cube. The cube reflects polarized light from the LEDs to the micro-display. The polarized light is reflected from the micro-display back toward the beam splitter cube. If the polarization state of the light has been rotated then it will pass through the beam splitter cube to an eyepiece that images the reflected light for the viewer. If the light is reflected from the micro-display without a change in polarization, then it will be reflected by the beam splitter cube away from the viewer and back toward the LED source.

Many applications of LCoS micro-displays require eyepieces that are much more compact and lighter in weight than is possible using the beam splitter cube structure described in the patent mentioned above. At the same time, the eyepiece should provide a wide field of view (preferably greater than 30 degrees diagonal). A large exit pupil is also desired to enable a large population with varying interpupillary distance to view the image without mechanical adjustments. Finally, the eyepiece should meet stringent optical performance criteria, including low distortion, low field curvature, high MTF (modulation transfer function), and small lateral color aberration. An eye relief of at least 25 mm is desired to permit the use of spectacles while viewing the virtual image.

In addition to the matters discussed above, in a binocular system, variations in interpupillary distance should be accommodated to allow for a greater range of viewers. Binocular optical systems can accommodate differences in interpupillary distance (IPD) between people in at least two ways. In one way, small eye-boxes (or exit pupils) can be used, the positions of which are mechanically adjustable to bring the eye-box directly in front of the viewer's eyes. This is how most field binoculars work. In a second way, large horizontal exit pupils can be created which can cover all normal variations in interpupillary distance between different people without adjustment. Wider eye-boxes are more difficult to design but are mechanically simpler and easier to operate.

A more compact eyepiece suitable for use with reflective displays such as an LCoS micro-display is shown in U.S. Pat. No. 6,046,867 to Rana. This design has a cemented prism block with an internal beam splitter, and an air-spaced Mangin-type mirror. A diffractive surface or element with a positive power is used as an eyepiece component and to reduce chromatic and other aberrations. However, with this positive power surface or element, it is very difficult or cumbersome to provide a long back focal length (BFL). A long back focal length helps to accommodate a frontlight in reflective display systems and allows the designer to provide a short effective focal length for the eyepiece in order to give a wider field of view for the user. In the present invention, a negative power element or surface can be used, as is commonly done in retrofocus lens designs to enhance the field of view.

Secondly, the design in the above-mentioned patent provides a telecentric pupil. A significantly non-telecentric design, for both the frontlight and the eyepiece can significantly improve compactness. Performance can also be greatly enhanced by tailoring the degree of non-telecentricity using a so-called field lens, not shown in the above-mentioned patent, located closest to the frontlight. The field lens can be a separate element, or it can be surface molded into the prism at the surface closest to the display.

BRIEF SUMMARY OF THE INVENTION

A method and apparatus are described that provide an enhanced viewing eyepiece for a micro-display. In one embodiment, the invention is an optical imaging system that includes a prism having a first face directed toward a display to receive light from the display and direct it through a second face, a converging optical element between the second face of the prism and the display, and a reflective converging optical element adjacent the second face of the prism to receive the display light through the second face of the prism and reflect it back into the second face of the prism, the invention further includes a diverging optical element aligned with the reflective converging optical element to receive the display light reflected back into the first prism and direct it to an exit pupil.

Other features of the present invention will be apparent from the accompanying drawings and from the detailed description that follows.

BRIEF DESCRIPTION OF THE SEVERAL VIEWS OF THE DRAWINGS

The present invention is illustrated by way of example, and not by way of limitation, in the figures of the accompanying drawings in which like reference numerals refer to similar elements and in which.

DETAILED DESCRIPTION OF THE INVENTION

Figure 1:
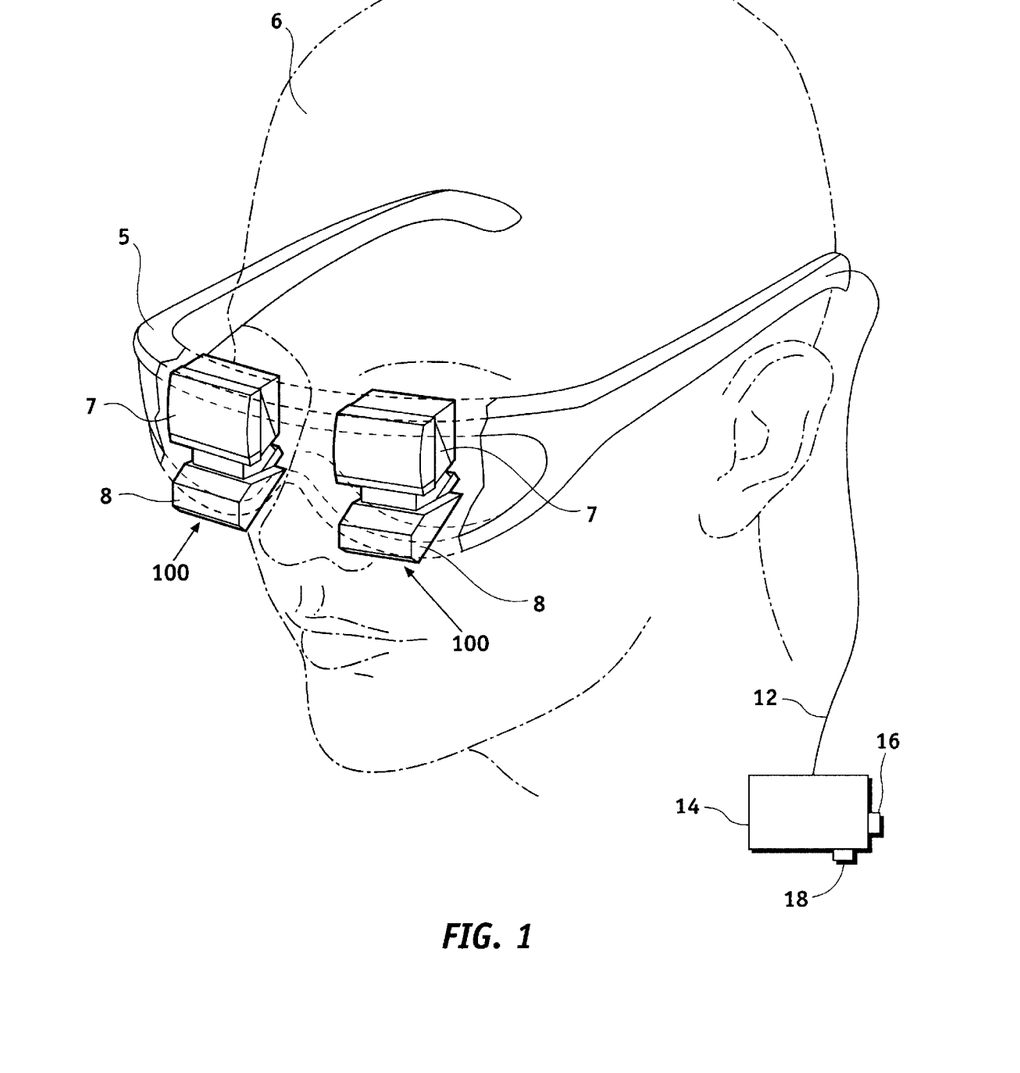
FIG. 1 is a perspective, partially cut-away view of a headset being worn by a viewer or user according to one embodiment of the present invention.

As shown in FIG. 1, one embodiment of the present invention is as a binocular display screen headset 5 configured to be worn on the head of a user or viewer 6. The headset 5 has a pair of small-area color displays 100 disposed within the headset. In one embodiment, the displays include LCoS panels available from Zight Corporation. Each of the displays has a display panel (not shown) positioned behind an eyepiece 7, shown in more detail in FIGS. 3 and 4, that is directly in front of a respective eye of the user so that each eye views a single one of the displays. In one embodiment, the pixellated areas of each of the display panels is rectangular, 9.6 mm wide and 7.2 mm high. The headset is configured to fit comfortably against the face of the user with or without eyeglasses between the user and the headset eyepieces. Each of the displays 100 includes a lighting apparatus 8, shown in more detail in FIG. 2, to illuminate the display panel.

The headset is coupled through a cable 12 to a display driver 14. The display driver receives video signals through a port 16 and power through a power connector 18 and converts the video signals into a form suitable for driving the displays. The video signals can be from a television, computer, video player or any other video or data source. The video can be for single or for stereovision in which the two displays project different images to simulate perspective. Alternatively, the headset can be a monocular headset with a single display, eyepiece, and lighting apparatus.

Figure 2:
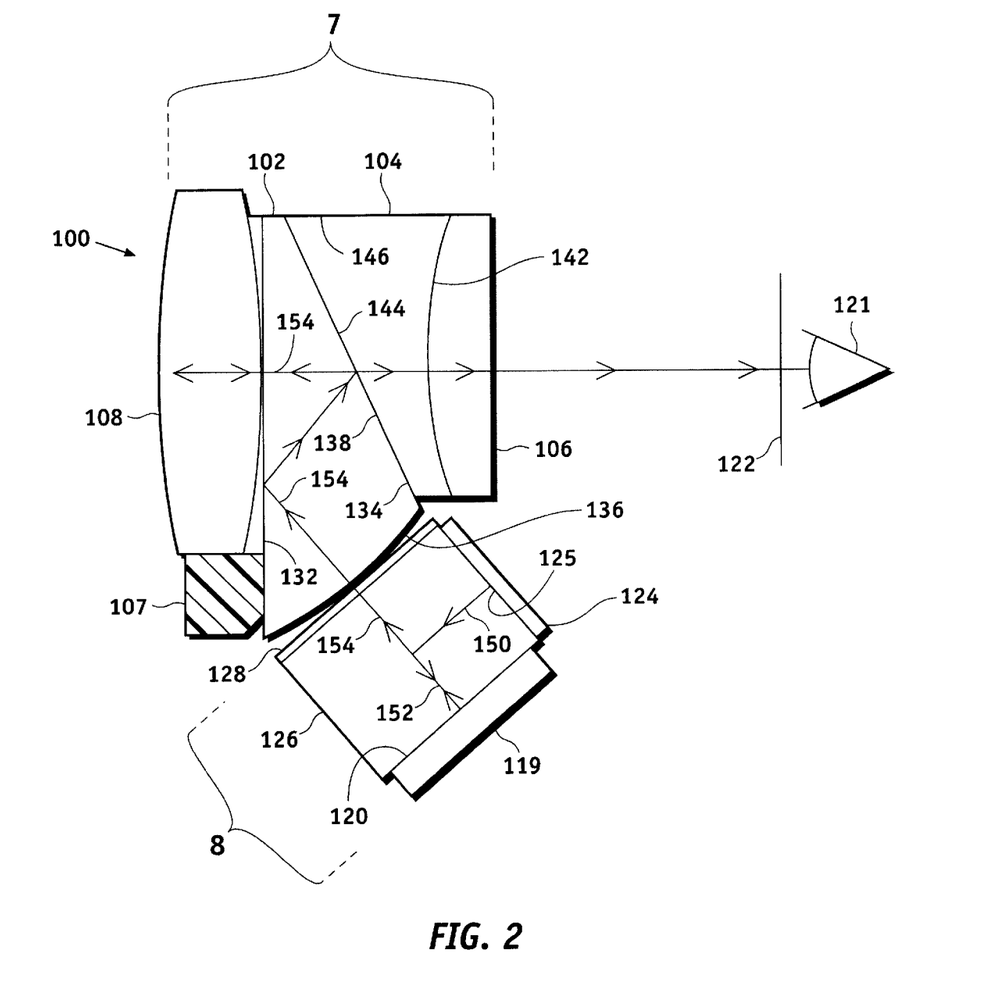
FIG. 2 is a side cross-sectional schematic view of an eyepiece according to one embodiment of the invention.

FIG. 2 is a schematic side view of a first embodiment 100 of a compact, light-weight optical imaging system according to the invention. The optical imaging system 100 is suitable for use in virtual displays and other types of miniature displays having similar performance requirements. In one embodiment, two such displays are placed side-by-side in a wearable headset as shown in FIG. 1, so that one display is oriented in front of each eye of the wearer. The optical imaging system includes an eyepiece portion 7 and a lighting apparatus or frontlight portion 8. The eyepiece portion has a first prism 102, and a second prism 104 cemented to the first prism with optical cement to form an optical beam splitter. A converging optical element 136 is formed on a surface of the first prism to act as a field lens for the display light. A diverging transmissive element 106 is formed on a surface of the second prism as a diffractive optical element. The negative power optical element 106 gives the eyepiece portion a long back focal length according to retro focus principles. Either element can also be provided as a separate lens adjacent the respective prism.

A converging reflective element 108, for example a Mangin mirror, is opposite and facing the diverging transmissive element 106, spaced from a side of the first prism. The Mangin mirror may include a diffractive optical surface on either its reflective or transmissive surface to perform the aberration correction functions of the negative power element 106. The optical imaging system 100 receives light from an object located at an image plane 120 and forms a non-inverted, enlarged, virtual image of the display that can be perceived by a user's eye 121 located at or near an exit pupil 122. The optical imaging system can be configured to locate the virtual image at any predetermined distance from the exit pupil. In one embodiment, the projected virtual image is located 2 m from the exit pupil with a size of 1040 mm by 780 mm. The eye relief is 25 mm. The illustrated optical system provides a short effective focal length of, for example, 18.3 mm with a very large aperture of f/1.3 in the horizontal and f/2.7 in the vertical. The short effective focal length permits a very wide field of view of about 36 degrees even with small displays. The large aperture permits a large exit pupil especially in the horizontal of about 12 mm, which allows the display to be used without adjustment by viewers with very different interpupillary distances. The exit pupil size in the vertical dimension is about 6 mm. This superior performance is achieved using the configuration described in more detail below.

In the optical imaging system 100, the first prism 102 has a substantially triangular cross-section in the plane of the drawing, and includes a second face 132 facing the Mangin mirror. This face is flat in the illustrated embodiment and can have an anti-reflective (AR) coating. The prism has a third substantially flat face 134 facing the second prism. This face, or alternatively, the complementary face of the second prism, is coated with a semi-reflective coating layer 138 that is not sensitive to polarization. In any embodiment with polystyrene polycarbonate, acrylic, zeonex or other plastic material prisms, birefringence will vary non-uniformly through the prism material. The birefringence creates non-uniform polarization variations throughout the prism. A conventional beam splitter reflects and transmits light differently depending on the polarization state. Accordingly, such a conventional beam splitter will convert the variations in polarization over the image to a variation in brightness which can easily be seen by the viewer. Accordingly, with plastic prisms, it is preferred that the semi-reflective coating reflect approximately half of the light and transmit approximately half of the light without any substantial sensitivity to the polarization of the light.

A metal-dielectric-metal coating can be used to accomplish such a half-mirror. One such suitable coating is ZnS 39 nm, Ag 23 nm, ZnS 81 nm. In another embodiment, $TiO_2$ is substituted for the ZnS. The semi-reflective layer 138 can be deposited on the face of either prism by a suitable deposition process as is well-known in the art. Such a coating will reflect and transmit nearly equal portions of light without regard to polarization or wavelength throughout the visible spectrum (450 nm–650 nm). For incident angles between 10 and 40 degrees in the polystyrece, after cementing the prisms together, $R_{avg}*T_{avg}$=22% to 24%, where $R_{avg}$ is the average reflectance and $T_{avg}$ is the average transmissivity. The sensitivity to polarization can be measured by comparing the transmissivity of S-polarized light Ts to the transmissivity of P-polarized light $T_P$. The difference is less than 5% with the coating described above. Similarly the difference between the reflectance of S and P-polarized light $|R_S-R_P|$ is also less than 5%. If glass or some other material with a low birefringence is used for the prisms, the semi-reflecting coating layer can be in the form of a polarizing beamsplitting layer or film or it can be some other type of half-mirror.

The first prism has a first face 136 facing the image plane. In one embodiment, the first face has a convex surface that forms a field lens to converge divergent rays of the image plane light as it enters the first prism. The field lens serves to reduce the effective focal length and to control the pupil image location and quality. The field lens may be formed on the prism surface as shown in FIG. 2 or it may be provided as a separate optical element cemented to or adjacent to a curved or flat face of the first prism. In one embodiment, the display size at the image plane is 9.6 mm by 7.2 mm and the back focal length of the eyepiece portion of the optical system is about 6 mm in air.

The included angle of the first prism between the Mangin mirror face 132 and the third face facing the second prism 104 is about 25 degrees. The included angle between the third prism face 134 and the image plane face 136 is about 105 degrees and the third included angle between the image plane face and the Mangin mirror face is about 50 degrees. As can be seen in FIG. 2, the corner of the prism between the Mangin mirror face and the third face has been truncated to reduce the overall size of the prism. The corner can be left with the prism if desired. The specific angles can be adapted to fit particular size and shape constraints. One important optical constraint is to provide total internal reflection (TIR) for light traveling from the display toward the Mangin mirror face of the prism 132. Satisfying this constraint will depend on the index of refraction of the prism. Additional optical constraints are compact size and a large eyepiece numerical aperture given the index of refraction of the prism material. The prism angles provided above are believed to provide a good optimization for the illustrated embodiment.

The second prism 104 also has a substantially triangular cross-section in the plane of the drawing and includes a first face 142 facing the exit pupil 122. In one embodiment, a diverging transmissive element 106 is applied to this exit pupil face. The second prism has a second substantially flat face 144 facing the first prism, and a third substantially flat face 146 that is not optically functional facing away from the image plane. The included angle between the exit pupil face 142 and the first prism face 144 of the second prism is substantially 25 degrees in order to complement the corresponding angle of the first prism. As can be seen from the drawings, this corner has also been truncated to reduce the size of the optical system. The included angles between the other faces are not important. The exit pupil face 142 is arranged to be perpendicular to the optical axis of the diffractive optical element 106 and the third non-functional face is arranged to be parallel to this optical axis, although its particular shape and orientation are not important. The specific angles can be adapted to fit particular size and shape constraints in concert with the first prism.

As discussed above, the second face 144 of the second prism 104 is cemented to the third face 134 of the first prism 102 with an appropriate optical cement and a metal-dielectric-metal coating to form an optical beam splitter that is not polarization dependent. The two faces are oriented so that the Mangin mirror face of the first prism 132 is opposite and substantially parallel to the exit pupil face 142 of the second prism.

The two prisms can be made of optical quality molded polystyrene with an index of refraction of approximately 1.590 available, for example, as Styron 685D from Dow Chemical or polystyrene G9504 from A & M Polystyrene of Japan. In one embodiment, the polystyrene contains no blue additives, ultraviolet light inhibitors or release agents in order to reduce hazing. Alternatively, the prisms can be made of polycarbonate or other high index optical plastics or of optical glass such as type BK7 glass from Schott Glass Technologies. This glass has a refractive index of 1.520. Polystyrene substantially reduces the weight and mass-production cost compared with a glass prism, and also allows the diffractive optical element 106 to be molded integrally as part of the second prism. In addition, the higher refractive index of the polystyrene allows more freedom in choosing prism angles while maintaining total internal reflection on the Mangin mirror face of the first prism. Glass may provide a sharper brighter image in certain applications and will preserve polarization when appropriate. The choice of materials is not critical to the invention nor is the specific optical index of refraction. Both prisms can be glass prisms, both prisms can be plastic prisms, or a mixture of a glass prism and a plastic prism can be used.

The rear element 108 is a converging reflective element, for example a Mangin mirror. In one embodiment it is formed of a bi-convex, plano-convex or meniscus lens that has a reflective coating such as protected silver on the convex face opposite the prism to form the reflective surface 140. A suitable coating would be a $Al_2O_3$—Ag—$Al_2O_3$ coating. In one embodiment, it is constructed from acrylic plastic with an index of refraction of about 1.492. Such optical acrylics are commonly available as is well-known in the art. It can also have an anti-reflection coating such as a single quarter-wave layer of $M_gF_2$ or other conventional dielectric multilayer films on the convex face facing the prism. The refractive surface of the Mangin mirror helps to reduce aberrations including chromatic aberrations. The rear element can be formed of single or bi-aspheric surfaces to minimize spherical and other aberrations. As an alternative, the rear element may be constructed of a mirror and a separate lens such that the combination has positive power. The mirror can be flat or curved. As another alternative, the rear element may be constructed as a mirror only.

In one embodiment, the rear element 108 is mounted to a frame 107 (see FIG. 4) that is, in turn, mounted to the first prism 102. The frame maintains an air space between the rear element and the first prism to allow total internal reflection off the face of the prism facing the rear element. In another embodiment, the rear element can have mechanical features which allow it to be mounted to the first prism without the need for the frame. Alternatively, the prism, rear element, and frame can be constructed of a single piece which does not require assembly. The optical axis of the rear element is centered on the optical axis of the front element 106, the diverging diffractive optical element. The rear element, the front element, and the field lens collectively constitute a three-element magnifying system that forms the non-inverted, wide field-of-view virtual image of an object located at the image plane 120. The front element can be a conventional spherical or aspherical compound lens to reduce chromatic aberration and to focus the image. As shown, the Mangin mirror is formed from an aspheric, but rotationally symmetric substrate on both surfaces in order to minimize aberrations.

As mentioned above, in the illustrated embodiment, the front element 106 is formed from a diffractive kinoform structure embedded in an aspheric substrate. In the case of the polystyrene second prism, a diffractive optical element can be smaller and lighter than an equivalent conventional lens, and cheaper to mass-produce. The diffractive optical element 106 is designed to provide the required dispersion and wavefront characteristics so as to correct chromatic aberration, especially lateral color aberration, and residual spherical aberration of the rear element.

The diffractive optical element 106 can be fabricated as a flexible or rigid thin-film element that is attached to the exit pupil face of the second prism 104 either mechanically or by using a suitable index-matched adhesive. To simplify assembly with a molded prism, the topological features of the diffractive optical element may be defined in the mold. This reduces the number of parts and eliminates the need to perform any alignment between the front element and the second prism because it is one monolithic piece. The diffractive optical element, like the Mangin mirror and the field lens is based on a rotationally symmetric aspherical substrate. The diffractive optical element can have a minimum pitch of 20 μm and a monotonic phase to significantly reduce manufacturing difficulty.

The image plane 120 is produced by a display 119. The display can be reflective such as an LCoS display, transmissive, such as a liquid crystal display or emissive such as a cathode ray tube, LED (light emitting diode), or OLED (organic light emitting diode) display. In the example of FIG. 2, for purposes of illustration, the display is a reflective display illuminated by a polarized light source 124 through a pre-polarizing film 125, and a polarizing beam splitter cube 126 as is well-known in the art. The polarizing beamsplitting cube may include a polymer film stack, wire grid polarizer, or dielectric coating stack at the diagonal beamsplitting surface. Before entering the eyepiece portion, the image is passed through a polarizing analyzer 128, such as an iodine-based PVA (poly-vinyl alcohol) film. Alternatively, the polarizing beam splitter may be replaced by a half mirror.

The single light source 124 can be made up of multiple LEDs adjacent to one another of a single or of multiple colors. Instead of LEDs, laser diodes, cold cathode or field emitter cathodoluminescent sources, incandescent, and fluorescent lamps together with a switchable color filter, or any other appropriate light source can be used. Collimating lenses, diffusers, and collectors can also be used to control the nature of the illumination. The particular design of the light source is not essential to the invention. For the polarizing beam splitter cube shown, the light source should include a polarizing element 125 similar to the analyzer 128 to optimize the contrast performance of the cube.

A more compact frontlight that produces diverging rays from the display is shown in co-pending patent application Ser. No. 09/872,073, filed on the same day as the present application, entitled Compact Near-Eye Illumination System and assigned to the same assignee as the present application, the disclosure of which is incorporated fully by reference herein. This frontlight allows an image of the aperture stop of the light source to be formed at the eyepiece pupil. It also provides a folded optical path length from the light source to the image plane which is not telecentric. To the eyepiece, the frontlight behaves as a plate of glass with parallel faces.

As mentioned above, the effective focal length of the eyepiece is made short in order to maximize the field of view for the viewer. In one embodiment, the display is 9.60 by 7.2 mm and the effective focal length is 18.3 mm. Conventionally, the back focal length of an eyepiece for the present application but without attention to maximizing the back focal length would typically be 1 or 2 mm. However, such a short back focal length does not allow enough room to accommodate the illumination system for the display. Rather than increase the effective focal length and reduce the field of view of the eyepiece, in the present invention, the back focal length is increased to accommodate the frontlight for the reflective display. As mentioned above, in the embodiment just discussed, the back focal length of the eyepiece system is approximately 6 mm in air. This is accomplished using a retrofocus design with a diverging front element 106 and appropriate powers on the field lens and Mangin mirror. Providing diverging rays from the image plane of the display complements the design.

When the rays from the image plane to the eyepiece are diverging, a wider field of view and larger numerical aperture can be provided than is possible with previous designs of the same size. Accordingly, the field lens 136, as mentioned above, positions the entrance pupil close to the display. The frontlight shown in the co-pending patent application Compact Near-Eye Illumination System, mentioned above, provides just such a diverging image by forming an image of its aperture stop at the entrance pupil of the eyepiece. Improved optical performance is obtained by matching the entrance and exit pupil so that the entrance pupil of the eyepiece is coincident to the exit pupil of the frontlight. However, the image can be made to be diverging using other displays and other optical systems. An important function of the field lens is to position the entrance pupil of the eyepiece coincident with the exit pupil of the frontlight.

FIG. 2 also shows a tracing of a single central ray through the eyepiece. Light 150, pre-polarized by the polarizer 125, emanates from the light source 124 as S-polarized light. This light is reflected by the beam splitter cube to the display 119 and is either reflected as P-polarized light 152 back to the beam splitter cube or as S-polarized light. The S-polarized light from the display is reflected by the beamsplitting layer and directed at the light source 124. The P-polarized light 154 passes through the beam splitter layer to render the display to the viewer. From the cube, it propagates through the polarizing "clean-up" analyzer 128 and the field lens 136 into the first eyepiece prism. As diverging rays emanating from the display, the field lens is a converging element which reduces the divergence without eliminating it. Within the prism, the light path is folded by total internal reflection (for high efficiency) off the rear face 132 of the prism and folded by the partially reflecting coating 138 back to the rear face 132 of the prism and then to the rear element 108 of the eyepiece.

Roughly half of the display light within the first prism is not reflected by the semi-reflecting layer but is transmitted through it. This light enters the second prism 104 at an angle to the optical axis of that prism. It then passes across the optical axis and exits the system though the prism's other flat surface 104 or is absorbed by blackened areas of the eyepiece to control stray light. For the reflected light, the folded light path aligns the display light with the optical axis between the rear element 108 and the front element 106 of the eyepiece. The display light directed to the rear element by the prism is reflected off the rear element and directed along the optical axis through the semi-reflective layer 138 and the front element 106 to the exit pupil 122 and the viewer 121.

Roughly half of the incident light traveling along the axis from the rear element toward the exit pupil is reflected by the semi-reflective layer 138 back into the first prism 102 back along the path from which it came. The portion of this light that is S polarized will be absorbed by the analyzer 128. The portion that is P polarized will pass back through the beam splitter cube and illuminate the display 119.

Roughly half the light that is incident on the beam splitter or semi-reflective layer 138 is returned to the display 119. The portion of this light that is reflected from the display back through the eye-piece constitutes a ghost image which is especially visible when the image consists of completely white and completely black portions. The light emitted from the white portion of the display normally is transmitted through the polarizing beam splitter (PBS) 127 and analyzer 128 in the frontlight before entering the eyepiece. After reflecting at the eye-piece beam splitter, this ghost light passes through the analyzer and PBS again on the way to the display. This ghost light can be significantly reduced by introducing an absorbing contrast enhancement filter between the eye-piece and the display. A preferred location is between the frontlight and the eyepiece. In this location, three traversals of the filter are required for the ghost light but only one traversal is required for the image light, so that, if the transmission of the filter is T, the contrast (image brightness/ghost brightness) is enhanced by a factor of $T^2$. The filter may be neutral or it may be colored to balance the primary colors of the display. The filter can be integrated with analyzer 128, if desired.

In the case of an eye-piece made from material with substantially zero birefringence, the ghost light can be eliminated almost completely by introducing a quarter wave retarder between the eyepiece and the frontlight. The light reflected from the beam splitter in the eye-piece then undergoes two traversals of the retarder and gets absorbed by the analyzer before returning to the display.

In some applications of the optical imaging system 100, the reflectivity of the mirrored surface of the rear element 140 is maximized in order to maximize the brightness of the image projected to the user's eye 121 located near the exit pupil 122. In practice, a reflectivity as high as 95%–98% may be used. In such embodiments, as mentioned above, the reflective surface is encapsulated with a suitable sealant to protect the silvered reflective surface. In other applications, it may be desired to superimpose the image from the display on a view of the user's environment. In such an embodiment, the reflectivity of the reflective surface 140 can be made substantially less than 100%, e.g., about 50%, to allow light from the user's environment to pass through the rear element. The rear element and the front element in that case collectively form an image of the user's environment as well as an image of the display.

An auxiliary lens system may be added after the Mangin mirror to improve the viewer's perception of the outside world. In the illustrated embodiment, without an auxiliary lens system, the effective focal length of the eyepiece system looking through the Mangin mirror would be about 1.6 m, providing a small magnification. Distortion would be low, depending on the particular design, typically less than 10%. The auxiliary lens system (not shown) can be added behind the Mangin mirror to compensate for the magnification and distortion as is well-known in the art.

Figure 3:
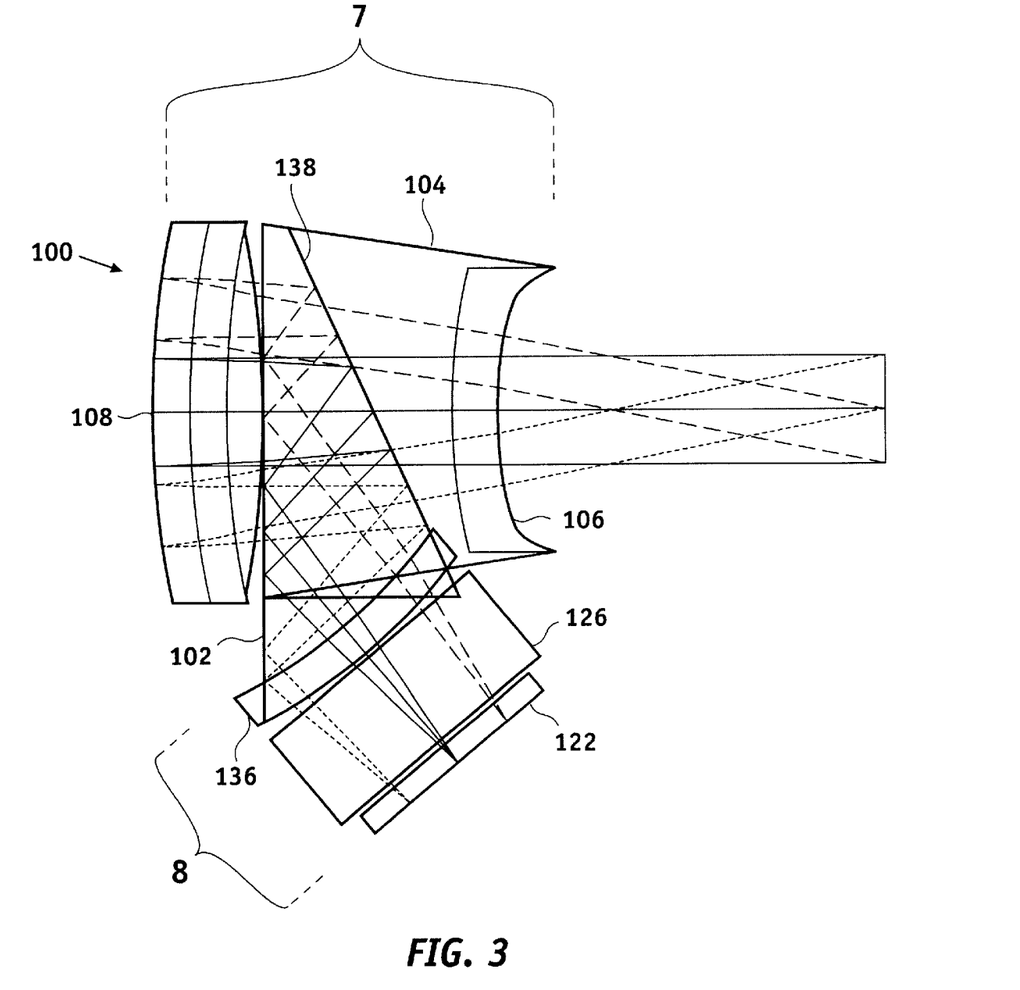
FIG. 3 is a side cross-sectional schematic view of the eyepiece of FIG. 2 showing light paths for axial and non-axial rays.

FIG. 3 shows a ray tracing for axial and off-axis rays reflected off the display 119 at the image plane 120. The image is folded twice in the first prism and then focused on the exit pupil.

Figure 4:
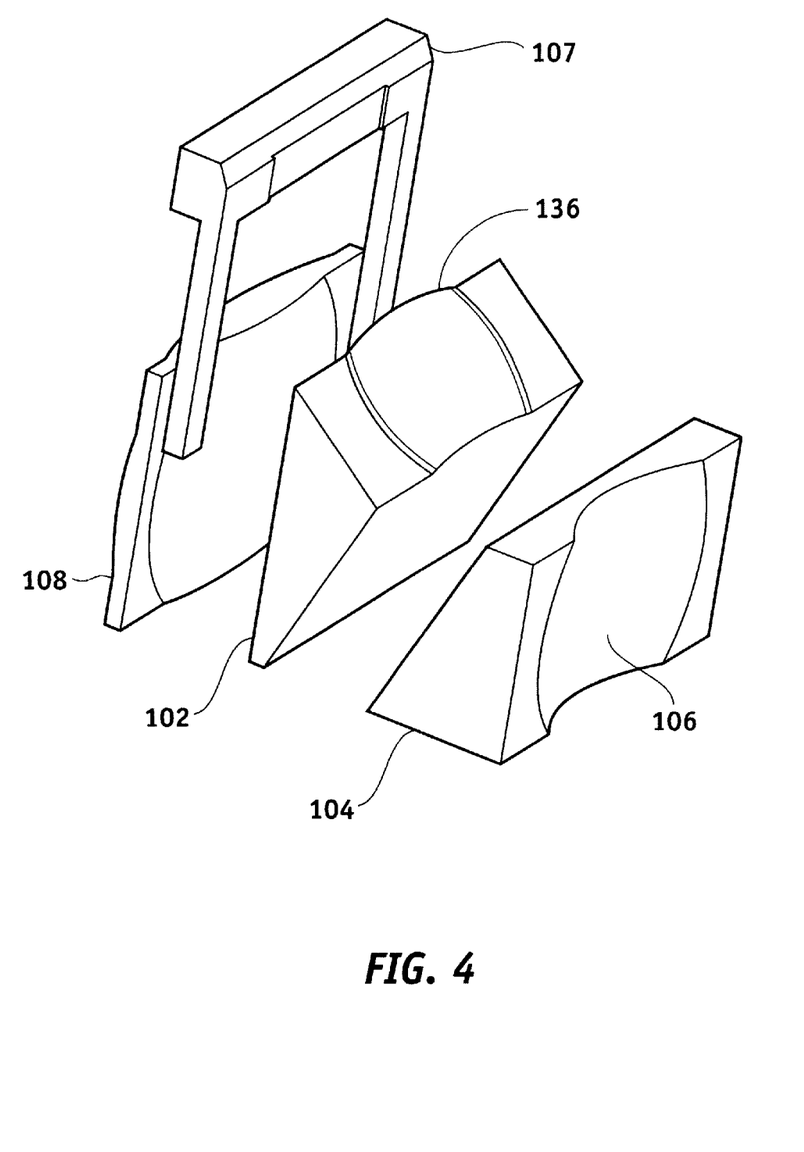
FIG. 4 is an exploded perspective view of a portion of the eyepiece of FIG. 2.

FIG. 4 shows an exploded perspective view of the first 102 and second 104 prisms, the rear element 108, and the mounting bracket 107. The optical converging and diverging surfaces of each piece are more easily seen in this drawing. In the illustrated embodiment, the display 119 produces a rectangular image with an aspect ratio of 4:3 similar to that of a typical television or computer monitor. In order to minimize the size of each piece, the optical surfaces are rectangular with an aspect ratio determined by the aspect ratio of the display (4:3) and the aspect ratio of the exit pupil (2:1). The pieces are preferably molded in shapes that facilitate optical alignment and are cemented together. For surfaces that do not require optical cement for optical coupling, the parts may use a snap fit as a connection.

It is preferred that the prisms, the field lens, the front element, and the rear element all be coated with an antireflective coating on all surfaces that are not described herein as having another coating. It is also preferred that the field lens, front element, and rear element have rotationally symmetric, aspherical optical surfaces as described below.

The front element 106 is a diffractive optical element, defined by the following aspherical coefficients, based on an ashperical formulation as follows:

$$Z=(cr^2/(1+(1-(1+k)c^2r^2)^{1/2}))+\alpha_1 r^2+\alpha_2 r^4+\alpha_3 r^6+\alpha_4 r^8+\alpha_5 r^{10}+\alpha_6 r^{12}+\alpha_7 r^{14}+\alpha_8 r^{16}$$

Where c=1/R, R being the vertex radius of the optical element and r=the radial distance from the optical axis of the surface For the front element, R=−30.62, k=1.93

| | | | |
|---|---|---|---|
| $\alpha_1 = 0.00$ | $\alpha_2 = -1.21 \times 10^{-6}$ | $\alpha_3 = 1.03 \times 10^{-7}$ | $\alpha_4 = 2.88 \times 10^{-9}$ |
| $\alpha_5 = -7.34 \times 10^{-11}$ | $\alpha_6 = 6.96 \times 10^{-13}$ | $\alpha_7 = -2.62 \times 10^{-15}$ | $\alpha_8 = 2.41 \times 10^{-18}$ |

The diffractive kinoform of the front element 106 is defined by a diffractive phase polynomial as follows:

| | | | |
|---|---|---|---|
| $\alpha_1 = 0.00$ | $\alpha_2 = 9.40 \times 10^{-7}$ | $\alpha_3 = -2.12 \times 10^{-8}$ | $\alpha_4 = -4.43 \times 10^{-11}$ |
| $\alpha_5 = -9.22 \times 10^{-14}$ | $\alpha_6 = 0.00$ | $\alpha_7 = 0.00$ | $\alpha_8 = 0.00$ | where ρ is the normalized radius=13.0 mm. $A_1=-800$, $A_2=375$

The rear element 108 is a Mangin-type mirror with a reflective side and a transmissive side. Both surfaces are rotationally symmetric, aspherical surfaces as defined above. The surfaces are defined by the following coefficients:

For the rear element transmissive surface, R=52.95, k=−0.45

| | | | |
|---|---|---|---|
| $\alpha_1 = 0.00$ | $\alpha_2 = 2.99 \times 10^{-6}$ | $\alpha_3 = 4.22 \times 10^{-10}$ | $\alpha_4 = -2.76 \times 10^{-11}$ |
| $\alpha_5 = -2.16 \times 10^{-14}$ | $\alpha_6 = 0.00$ | $\alpha_7 = 0.00$ | $\alpha_8 = 0.00$ |

For the rear element reflective surface, R=−77.17, k=2.49

$$\Phi = \sum_{i=1}^{N} A_i \rho^{2i},$$

The field lens surface 136 is defined by the following aspherical coordinates:

For the field lens element, R=31.75, k=0

| | | | |
|---|---|---|---|
| $\alpha_1 = 0.0015$ | $\alpha_2 = -9.04 \times 10^{-6}$ | $\alpha_3 = -3.83 \times 10^{-7}$ | $\alpha_4 = 2.58 \times 10^{-9}$ |
| $\alpha_5 = 9.95 \times 10^{-12}$ | $\alpha_6 = -6.47 \times 10^{-14}$ | $\alpha_7 = -5.37 \times 10^{-16}$ | $\alpha_8 = 2.55 \times 10^{-18}$ |

In the present description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in diagram form. The specific details may be supplied by one of average skill in the art as appropriate for any particular implementation.

Importantly, while embodiments of the present invention are described with reference to a binocular headset, the apparatus described herein are equally applicable to any type of eyepiece for a small display whether for one eye or both, in which compactness and a wide field of view and are desired. For example, the techniques described herein are thought to be useful in connection with compact computer and data device displays, monocular headsets, digital camera viewfinders, camcorder viewfinders, internet appliance viewers, mobile communicator viewers and entertainments headsets for video and game players.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. An optical imaging system comprising:
    a prism having a first face directed toward a display to receive light from the display and direct it through a second face;
    a converging optical element between the second face of the prism and the display; a reflective converging optical element adjacent the second face of the prism to receive the display light through the second face of the prism and reflect it back into the second face of the prism;
    a diverging optical element having a negative power and being aligned with the reflective converging optical element to receive the display light reflected back into the prism and direct it to an exit pupil.

2. The system of claim 1, wherein the converging optical element comprises a field lens.

3. The system of claim 1, wherein the converging optical element is formed on the first face of the prism.

4. The system of claim 1, wherein the reflective converging optical element comprises a Mangin mirror.

5. The system of claim 1, wherein the diverging optical element comprises a diffractive optical element shaped to correct aberrations of the optical imaging system.

6. The system of claim 5, wherein the diffractive optical element is a kinoform optical element.

7. The system of claim 1, wherein the reflective converging optical element comprises a diffractive optical element shaped to correct aberrations of the optical imaging system.

8. The system of claim 1, further comprising a second prism cemented to the first prism and a semi-reflective layer between the first and second prisms, the second prism being positioned so that the display light reflected back into the first prism is directed to the semi-reflective layer and the portion that is transmitted through the semi-reflective layer transmits through the second prism to the exit pupil.

9. The system of claim 8, wherein the diverging optical element is formed on a surface of the second prism.

10. The system of claim 8, wherein the reflectance and transmissivity of the semi-reflective layer are relatively insensitive to polarization.

11. The system of claim 8, wherein the semi-reflective layer comprises a stack of a metal layer and at least one dielectric layer.

12. The system of claim 8 wherein semi-reflective layer comprises a dielectric-metal-dielectric layer stack.

13. The system of claim 1 further comprising:
    a light attenuating element between the prism and the display.

14. An optical imaging system comprising:
    a converging field lens proximate an entrance pupil, a display being positioned between the field lens and the entrance pupil;
    a converging optical element to receive an image of the display from the field lens; and
    a diverging optical element to focus the image of the display from the converging optical element to an exit pupil.

15. The system of claim 14 further comprising folding optics to relay the image of the display from the field lens to the optical axis of the converging optical element.

16. The system of claim 15, wherein the field lens is formed on a face of the folding optics.

17. The system of claim 15, wherein the folding optics comprises a prism, the system further comprising a second prism cemented to the first prism and a semi-reflective layer between the first and second prisms, the semi-reflective layer relaying the image of the display to the converging optical element and transmitting the image of the display through the second prism to the exit pupil.

18. The system of claim 17, wherein the diverging optical element is formed on a surface of the second prism.

19. The system of claim 14 wherein the converging optical element comprises a mirror.

20. The system of claim 19, wherein the mirror comprises a Mangin mirror.

21. The system of claim 14, wherein the diverging optical element comprises a diffractive optical element shaped to correct aberrations caused by optical imaging system.

22. The system of claim 14 further comprising a light attenuating element between the field lens and the display.

23. A headset display system comprising:
    a headset adapted to be worn by a user;
    a display panel for producing a display;
    a converging field lens proximate an entrance pupil, the display being positioned between the field lens and the entrance pupil;
    a converging optical element to receive an image of the display from the field lens; and
    a diverging optical element to focus the image of the display from the converging optical element to an exit pupil.

24. The system of claim 23 further comprising an illumination system for the display panel.

25. The system of claim 23, further comprising:
    a first prism to relay the image of the display from the field lens to the optical axis of the converging optical element;
    a second prism cemented to the first prism; and
    a semi-reflective layer between the first and second prisms, the semi-reflective layer relaying the image of the display to the converging optical element and transmitting the image of the display through the second prism to the exit pupil.

26. The system of claim 23, wherein the headset system is a binocular headset system, the binocular headset system further comprising:
    a further display panel for producing a further display;
    a further converging field lens proximate a further entrance pupil, the further display being positioned between the further field lens and the further entrance pupil;
    a further converging optical element to receive an image of the further display from the further field lens; and
    a further diverging optical element to focus the image of the further display from the further converging optical element to a further exit pupil.

27. The system of claim 26, further comprising a display driver coupled to the display panels to drive the display panels and a video port coupled to the display driver to receive video signals for the display driver.

* * * * *